Aug. 12, 1930.  B. CASTER-UDELL  1,772,827
DOG BLANKET
Filed April 11, 1929   2 Sheets-Sheet 1
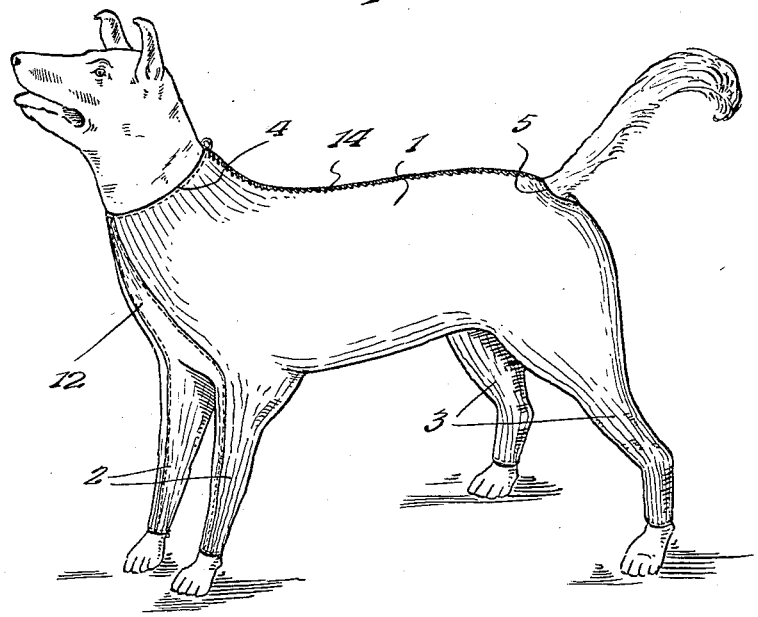
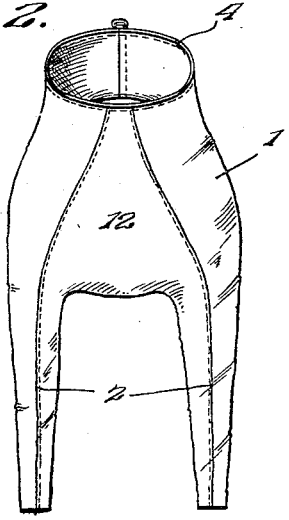
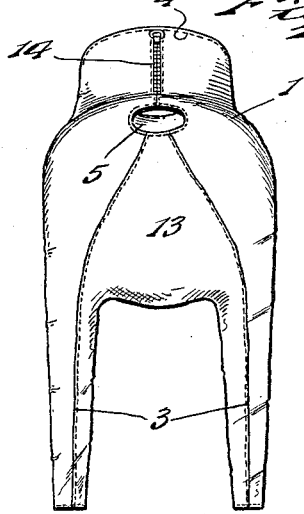
Inventor
Bessie Caster-Udell.
By Lacy & Lacy, Attorneys Aug. 12, 1930.  B. CASTER-UDELL  1,772,827
DOG BLANKET
Filed April 11, 1929   2 Sheets-Sheet 2
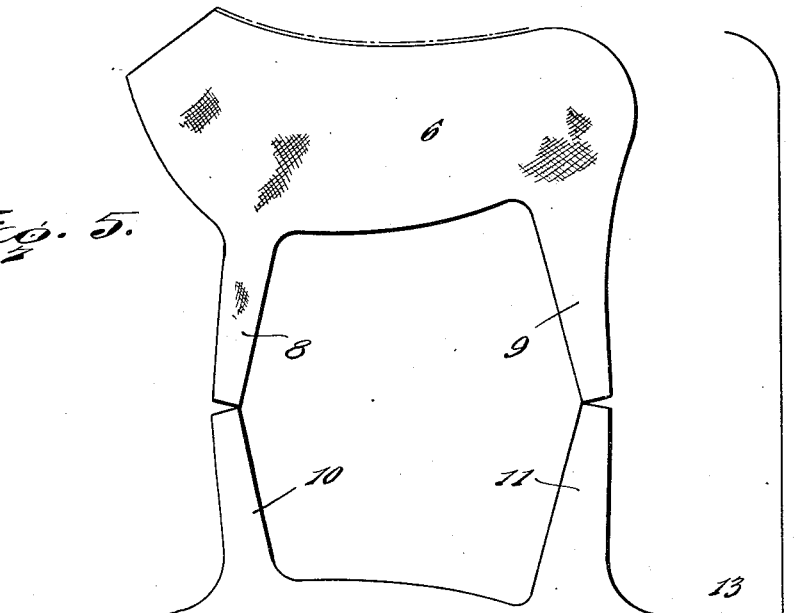
Fig. 5.
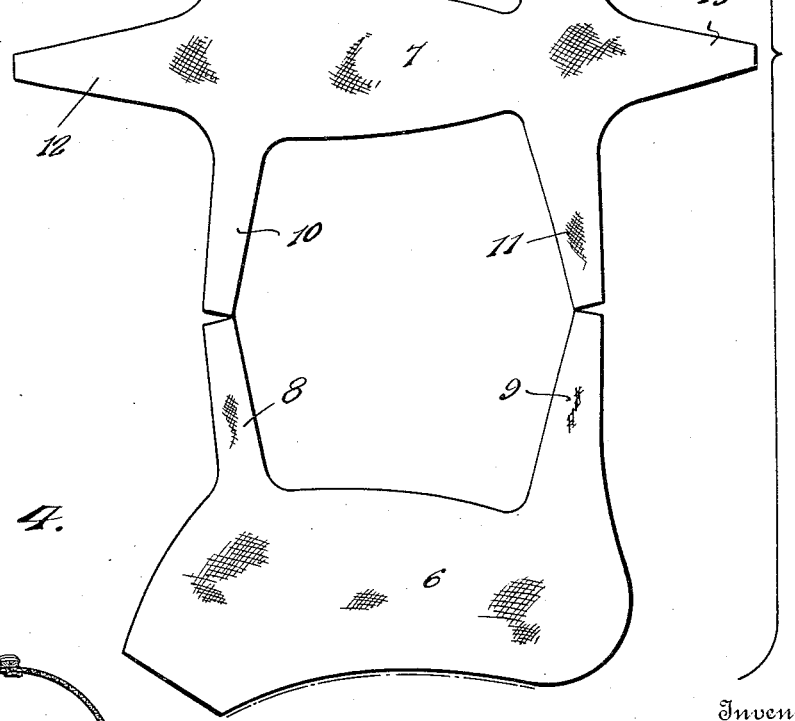
Fig. 4.
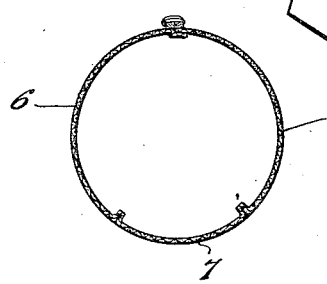
Inventor
Bessie Caster-Udell.
By Lacey & Lacey, Attorneys Patented Aug. 12, 1930

1,772,827

UNITED STATES PATENT OFFICE

BESSIE CASTER-UDELL, OF DODGE CITY, KANSAS, ASSIGNOR OF ONE-TENTH TO HENRY CASTER, OF DODGE CITY, KANSAS

DOG BLANKET

Application filed April 11, 1929. Serial No. 354,427.

This invention relates to a dog blanket and one object of the invention is to provide a device of this character which may be easily applied to a dog and serve to cover the same so that when a dog is riding in an automobile hair will be prevented from rubbing off the dog onto the seats or other portions of the automobile and also prevented from getting upon the clothing of persons riding in the machine.

Another object of the invention is to so form the dog blanket that it will conform to the contour of the animal and fit snugly when applied while at the same time allowing the dog to move freely.

Another object of the invention is to provide a device of this character which is simple in its construction and formed from a comparatively few number of parts which may be readily assembled.

The invention is illustrated in the accompanying drawings, wherein

Figure 1 is a perspective view showing the improved blanket applied to a dog,

Fig. 2 is a front view of the improved dog blanket,

Fig. 3 is a rear view thereof,

Fig. 4 is a transverse sectional view through the body portion of the blanket, and Fig. 5 is a view of the blanks from which the blanket is formed.

This improved dog blanket is formed from blanks shown in Fig. 5 and consists of a body portion 1 having front and rear leg extensions 2 and 3 and formed with neck and tail-receiving openings 4 and 5. The blanks which are designated 6 and 7 are cut as shown in Fig. 5 from any suitable material but are preferably formed from knitted fabric, such as Jersey, so that the blanket may expand and contract and thereby accommodate itself to the dimensions of the animal to which it is applied and fit snugly when in place. The blank 6 which forms side sections of the blanket conform to the general outline of a dog when viewed in side elevation and are provided with leg extensions 8 and 9 to the side edges of which are sewed the corresponding side edge portions of the leg extensions 10 and 11 of the lower section 7 which covers the under portion of the dog's body and is formed with front and rear extensions 12 and 13. These extensions extend upwardly, as shown clearly in Figs. 2 and 3, and are sewed to the front and rear portions of the side sections 6 thereby forming a complete blanket having the body portion and leg extensions. If so desired, the extensions 9 and 11 forming the rear legs may be shaped to conform to the contour of the rear legs of a dog or the elasticity of the material from which the blanket is formed may be depended upon to allow the leg portions to fit snugly about the dog's legs. The legs are open at their lower ends so that the dog's feet may be passed through them and thereby allow a dog to wear one of the blankets out of doors and run around upon the ground without soiling the lower portions of the leg extensions or causing them to be quickly worn out. The upper side edges of the sections 6 meet above the dog's back between the neck and tail openings and are releasably secured to each other by any desired fastening means, but in the preferred construction fasteners of the zipper type, such as shown in Fig. 3 and indicated by the numeral 14, are used. It will thus be seen that there has been provided a dog blanket which can be very easily applied to an animal by passing its front and rear legs through the leg portions 2 and 3 and his tail through the tail opening 5 and then securing the upper side edges of the side sections 6 along the dog's back between the tail and neck openings.

Having thus described the invention, I claim:

1. A blanket of the character specified comprising similar side sections having leg extensions projecting outwardly therefrom, and an end section joining the side sections and provided with outwardly projecting leg extensions matching and united to the leg sections of the side sections.

2. A blanket of the character specified comprising similar side sections having front and rear outwardly projecting leg extensions, and similar end sections joining the side sections and provided with outwardly projecting leg extensions matching and united to the leg extensions of the side sections.

3. A blanket of the character specified comprising similar side sections having front and rear outwardly projecting leg extensions, and a lower section provided with end sections and outwardly projecting leg extensions, the several parts being united along their meeting edges.

In testimony whereof I affix my signature.

BESSIE CASTER-UDELL. [L. S.]